United States Patent [19]
Boesvert

[11] Patent Number: 5,245,801
[45] Date of Patent: Sep. 21, 1993

[54] GRILL COVER HOUSING

[76] Inventor: Frederick A. Boesvert, 3409 Calle Del Torre, Las Vegas, Nev. 89102

[21] Appl. No.: 889,272

[22] Filed: May 28, 1992

[51] Int. Cl.⁵ .............................................. E04B 1/12
[52] U.S. Cl. ........................................... 52/63; 52/66; 52/70; 52/DIG. 14; 312/249.9; 312/326
[58] Field of Search ................... 52/DIG. 14, 66, 70, 52/71, 63; 135/87, 96, 101, 105, 111, 115, 120; 312/194, 249.9, 326; 248/100

[56] References Cited

U.S. PATENT DOCUMENTS

| | | | |
|---|---|---|---|
| 1,015,211 | 1/1912 | Rowley et al. | 248/100 |
| 3,120,076 | 2/1964 | Zuch | 52/70 |
| 3,655,253 | 4/1972 | Deeds et al. | 312/194 |
| 4,026,616 | 5/1977 | Kuehl | 312/250 |
| 5,071,204 | 12/1991 | Price et al. | 312/194 |

Primary Examiner—Carl D. Friedman
Assistant Examiner—Matthew E. Leno
Attorney, Agent, or Firm—Leon Gilden

[57] ABSTRACT

A cover housing arranged to receive a barbecue grill assembly therewithin providing for a work surface at a top portion of the housing. The housing is arranged to optionally include doors as well as wind deflector wings mounted to the upper perimeter edge of the housing structure.

1 Claim, 4 Drawing Sheets

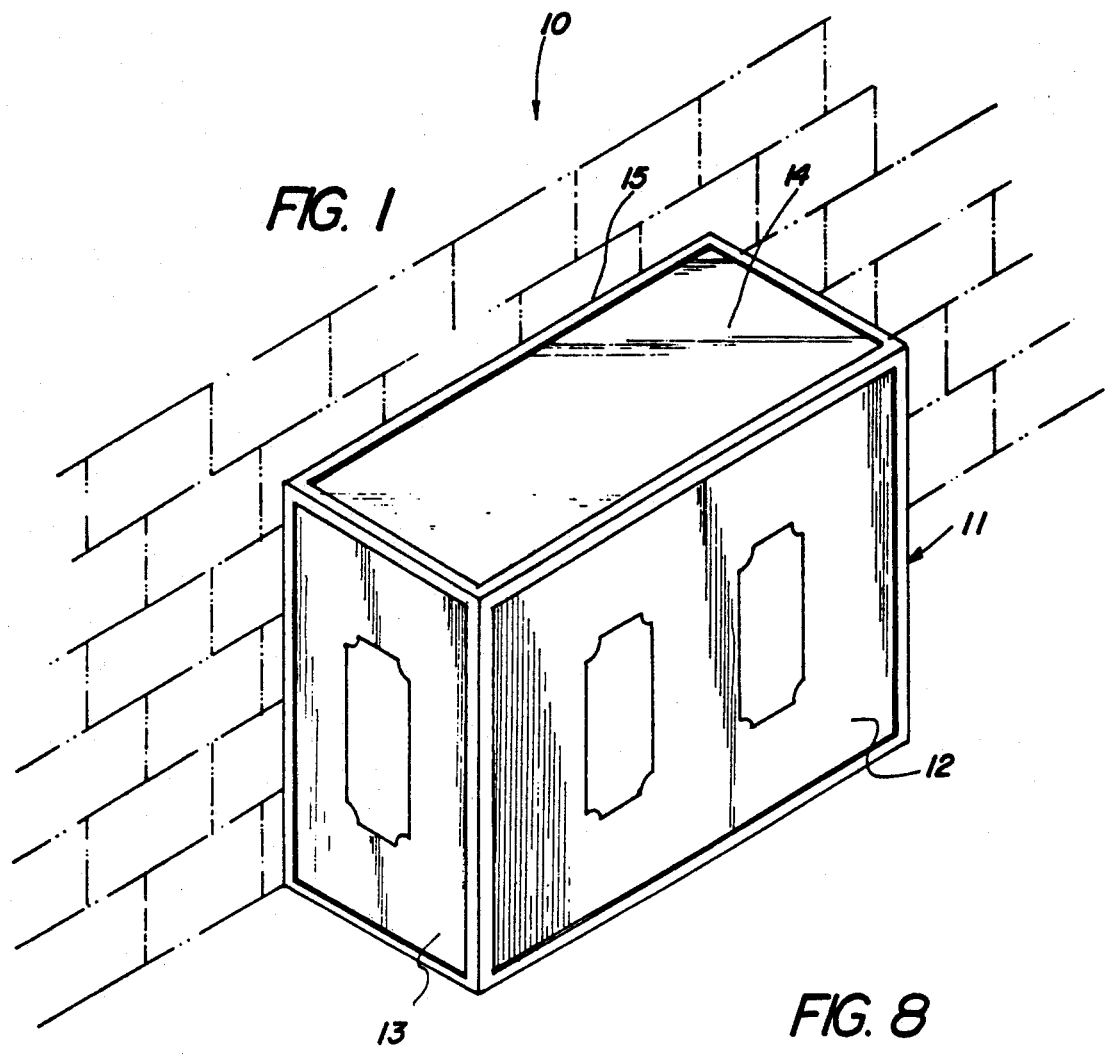
FIG. 1
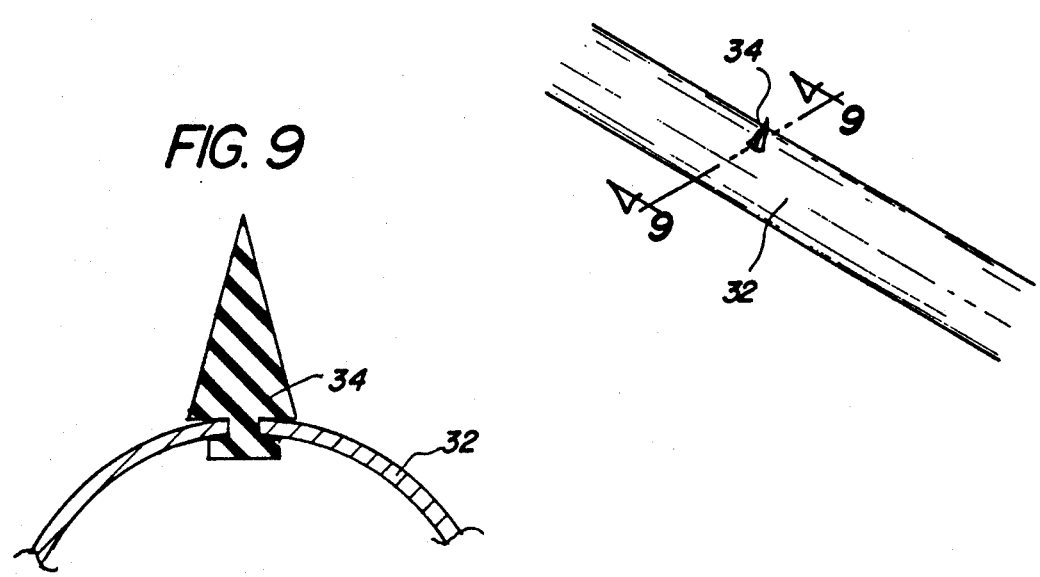
FIG. 8
FIG. 9

GRILL COVER HOUSING

BACKGROUND OF THE INVENTION

1. Field of the Invention

The field of invention relates to cover housing structure, and more particularly pertains to a new and improved grill cover housing wherein the same is arranged to accommodate and position a grill therewithin.

2. Description of the Prior Art

The contemporary popularity of barbecue grills has simultaneously led to an increase in theft of such organizations requiring owners to utilize various chains, locks, and the like to secure the relatively mobile grill structure to stationary supports. Accordingly, the attendant array of components becomes an unsightly organization in an effort to accommodate and cover the grill, as well as providing attendant work surface. The instant invention sets forth a housing structure to include a work surface as well as a readily positionable covering housing for the grill structure.

Various work surfaces and covers have individually been available in the prior art as exemplified by U.S. Pat. No. 4,705,084 to Rodebaugh setting forth a cover for outdoor table benches, with U.S. Pat. No. 4,057,291 to Dubisky setting forth a removable cover for outdoor chairs and lawn furniture.

Such cover structure further includes U.S. Pat. No. 4,876,830 to Waite setting forth a cover mounted telescopingly to provide for a covering of various components positioned at a base surface adjacent a vertical wall surfaced such as firewood and the like.

As such, it may be appreciated that there continues to be a need for a new and improved grill cover housing as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cover housing apparatus now present in the prior art, the present invention provides a grill cover housing wherein the same is arranged to provide for a relatively mobile rigid grill cover housing arranged for positioning in surrounding relationship relative to a barbecue grill. As such, the general purpose of the present invention, which will be described subsequently in greater detail, is to provide a new and improved grill cover housing which has all the advantages of the prior art cover apparatus and none of the disadvantages.

To attain this, the present invention provides a cover housing arranged to receive a barbecue grill assembly therewithin providing for a work surface at a top portion of the housing. The housing is arranged to optionally include doors as well as wind deflector wings mounted to the upper perimeter edge of the housing structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. These skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved grill cover housing which has all the advantages of the prior art cover apparatus and none of the disadvantages.

It is another object of the present invention to provide a new and improved grill cover housing which may be easily and efficiently manufactured and marketed.

It is a further object of the present invention to provide a new and improved grill cover housing which is of a durable and reliable construction.

An even further object of the present invention is to provide a new and improved grill cover housing which is susceptible of a low cost of manufacture with regard to both materials and labor, and which accordingly is then susceptible of low prices of sale to the consuming public, thereby making such grill cover housings economically available to the buying public.

Still yet another object of the present invention is to provide a new and improved grill cover housing which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 8 is an enlarged isometric illustration of section 8 as set forth in FIG. 7.

FIG. 9 is an orthographic view, taken along the lines 9—9 of FIG. 8 in the direction indicated by the arrows.

DESCRIPTION OF THE PREFERRED EMBODIMENT

Figure 2:
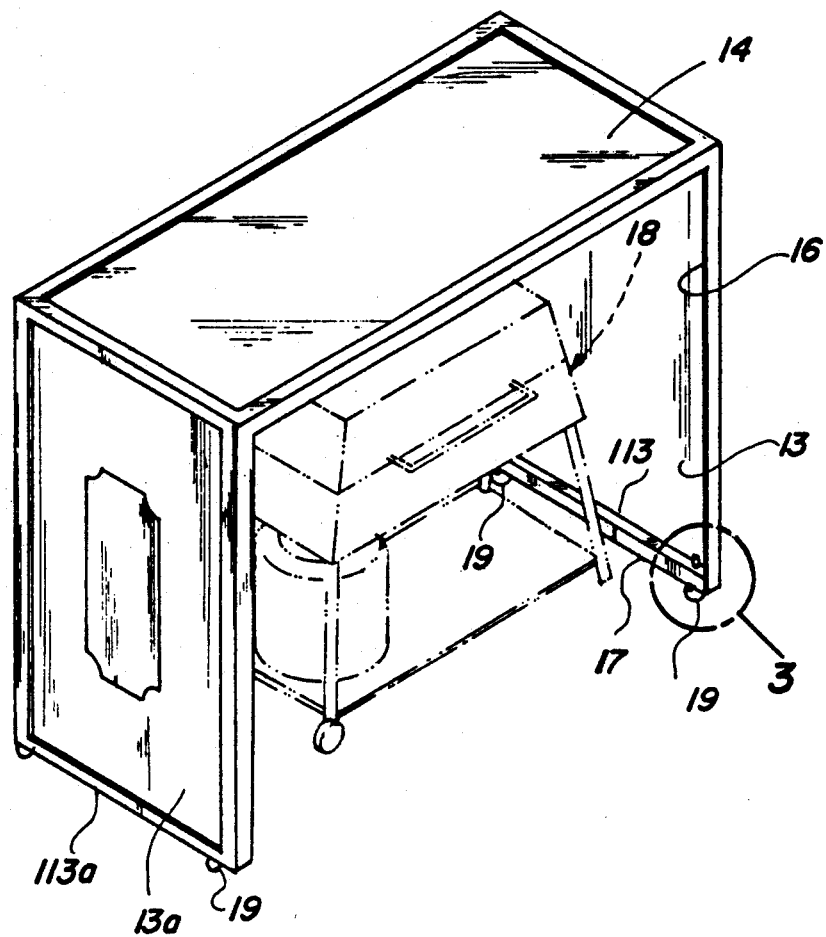
FIG. 2 is an isometric rear view of the invention.
Figure 3:
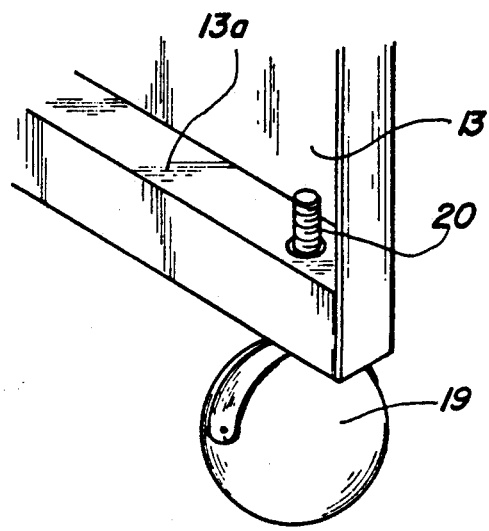
FIG. 3 is an isometric enlarged view of section 3 as set forth in FIG. 2.
Figure 4:
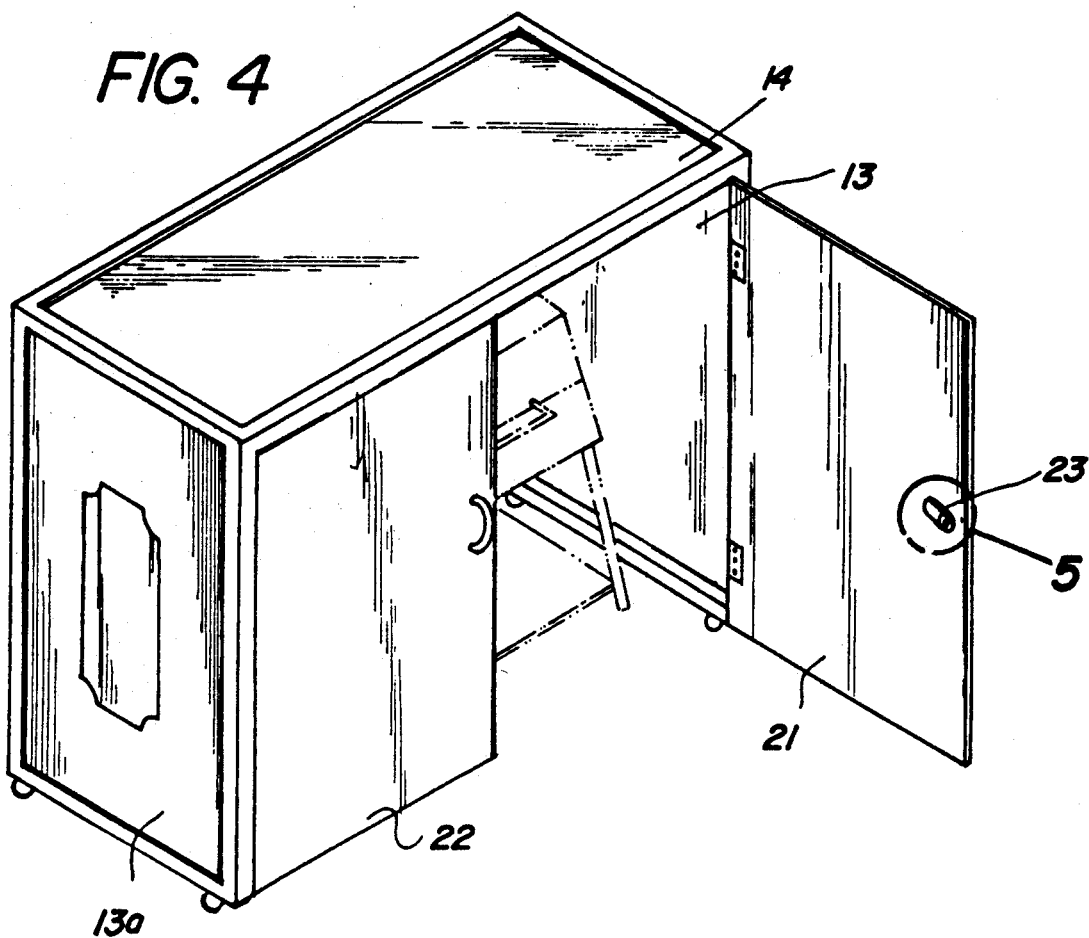
FIG. 4 is an isometric rear view of the housing utilizing covering doors.
Figure 5:
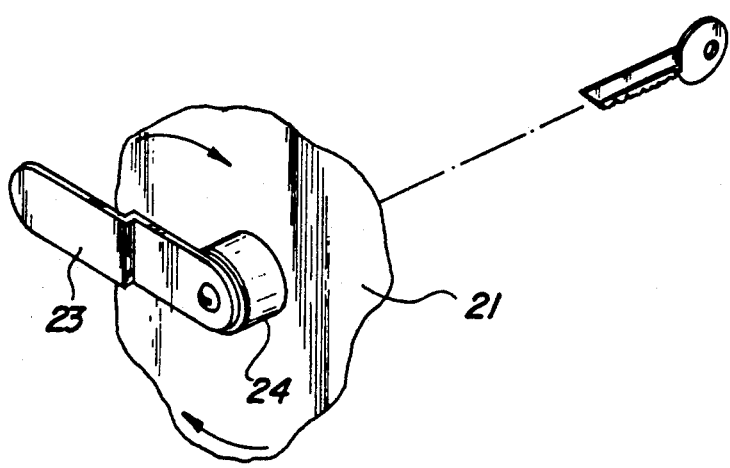
FIG. 5 is an enlarged isometric illustration of section 5 as set forth in FIG. 4.

With reference now to the drawings, and in particular to FIGS. 1 to 9 thereof, a new and improved grill cover housing embodying the principles and concepts of the present invention and generally designated by the reference numeral 10 will be described.

More specifically, the grill cover housing 10 of the instant invention essentially comprises a rigid housing including a front wall 12, parallel first and second side walls 13 and 13a, and a top wall 14. The top wall 14 further includes a top wall perimeter framework 15 formed with a first side wall frame leg at an upper distal end of the first side wall, a second side wall frame leg at an upper distal end of the second side wall, a front wall frame leg, and a rear frame leg to define a rectilinear perimeter framework 15. A rear wall entrance opening 16 and a floor entrance opening 17 to permit ease of accommodation of a barbecue grill assembly 18 therewithin. Caster rollers 19 each having an adjuster rod 20 threadedly directed through a lower frame rail 113 and 113a permit ease of mobility of the housing 11 relative to the barbecue grill assembly 18.

The FIG. 2 illustrates the rear wall entrance opening 16 having respective first and second doors 21 and 22 pivotally mounted to the respective first and second side walls 13 and 13a. A latch 23 mounted to the first door 21 includes a tumbler housing 24 to receive a latch key therewithin permitting ease of rotation of the latch 23 for securement to the second door 22 to secure the doors together.

Figure 6:
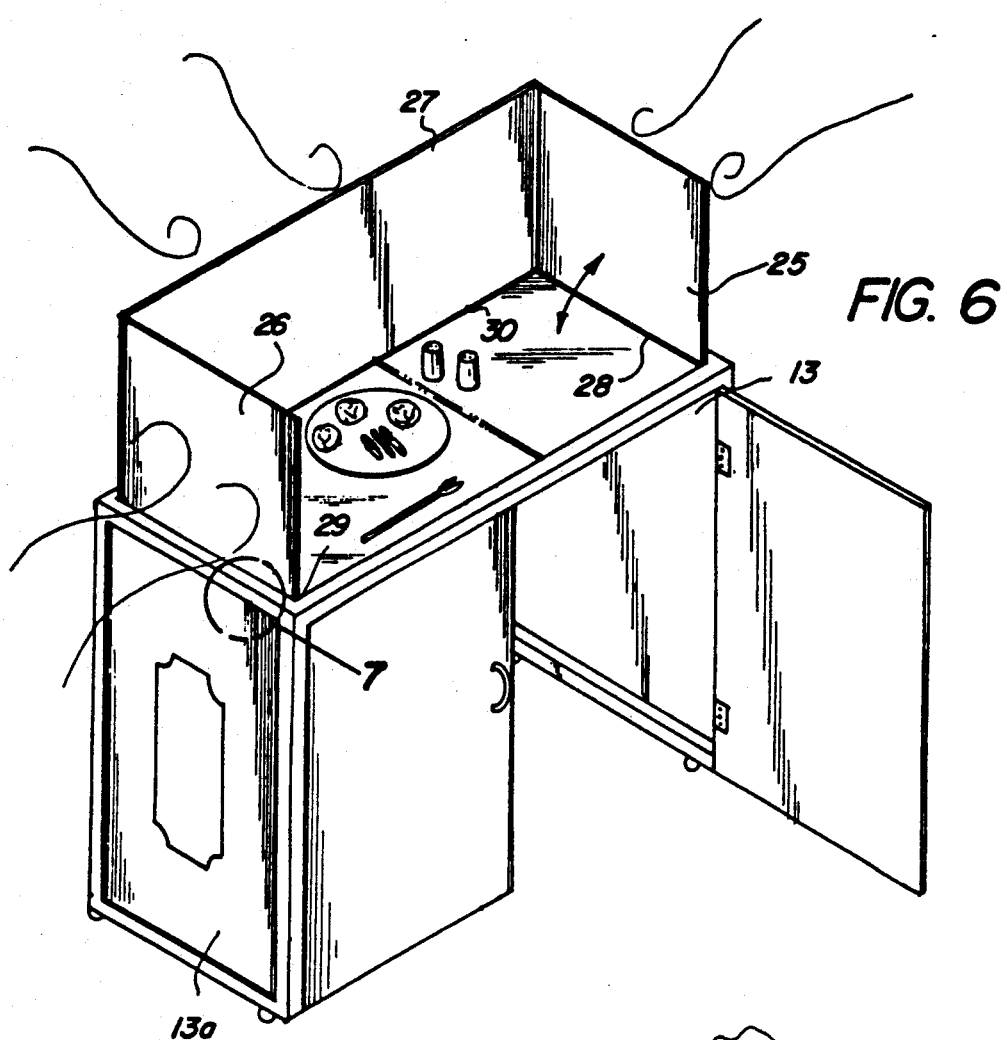
FIG. 6 is an isometric view of the invention utilizing wind deflector wings mounted to the upper portion of the housing.

The FIG. 6 illustrates the first and second side wall frame legs of the perimeter framework 15 having respective first and second wind deflector plates 25 and 26 hingedly mounted to the first and second side wall frame legs respectively about first and second spring hinges 28 and 29 to bias the first and second wind deflector plates 25 and 26 orthogonally relative to the top wall 14. A third wind deflector plate 27 including a third spring hinge 30 that is secured to the front wall frame leg maintains the third wind deflector plate 27 in a raised orientation orthogonally relative to the top wall 14. The deflector plates may include various latch organizations (not shown) to maintain the deflector plates in orientation relative to the top wall.

Figure 7:
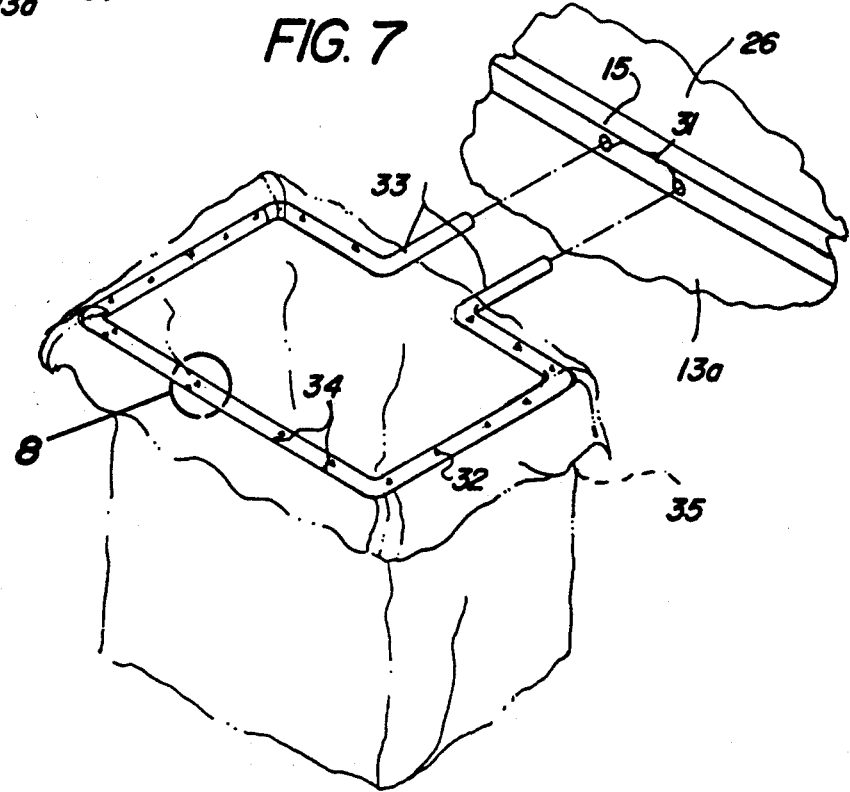
FIG. 7 is an enlarged isometric illustration of section 7 as set forth in FIG. 6.

The FIG. 7 illustrates the second side wall frame leg having second side perimeter frame leg apertures 31 to receive bag support frame legs 33 of a bag support frame 32 that is oriented orthogonally relative to the second side wall frame leg. The bag support frame 32 includes a plurality of spaced polymeric projections 34 (see FIG. 8 and FIG. 9) extending upwardly relative to the bag support frame 32 to receive an upper portion of a bag member 35 relative to the bag support frame 32 as the projections 34 are arranged to snag or pierce the bag member 35 to maintain its opening when mounted to the bag support frame 32.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A grill cover housing, comprising, a front wall, a first side wall orthogonally mounted to a first side of the front wall, and a second side wall orthogonally mounted to a second side of the front wall, with the first side wall and the second side wall arranged in a parallel coextensive relationship, and a top wall mounted orthogonally to the front wall, the first side wall, and the second side wall to define a cavity for receiving a barbecue grill therewithin, and a rear wall entrance opening directed through the housing and a floor opening directed through the floor of the housing for access to the cavity, and the top wall includes a perimeter framework, the perimeter framework extending above the top wall, with the perimeter framework having a first side wall frame leg at an upper distal end of the first side wall, a second side wall frame leg at an upper distal end of the second side wall, a front wall frame leg at an upper distal end of the front wall, and a rear frame leg parallel to the front wall frame leg, and a lower distal end of the first side wall includes a plurality of first caster rollers, a lower distal end of the second side wall includes a plurality of second caster rollers permitting ease of maneuverability of the housing, wherein the first caster rollers include first adjuster rods threadedly directed through the lower distal end of the first side wall, the second caster rollers include second adjuster rods threadedly directed through the lower distal end of the second side wall, and a first door mounted to the first side wall over the rear wall entrance opening, and a second door pivotally mounted to the second wall over the rear wall entrance opening, and a first wind deflector plate having a first spring hinge mounted to the first side wall frame leg, a second wind deflector plate having a second spring hinge secured to the second side wall frame leg, and a third wind deflector plate having a third spring hinge secured to the front wall frame leg, wherein the first wind deflector plate, the second wind deflector plate, and the third wind deflector plate are biased orthogonally relative to the top wall, and the second side wall frame leg includes a plurality of perimeter frame leg apertures spaced apart a predetermined spacing, and a bag support frame having bag support frame legs spaced apart the predetermined spacing received within the frame leg apertures, and the bag support frame includes a plurality of spaced polymeric projections mounted fixedly to the bag support frame for securing a bag member within the bag support frame, wherein the bag support frame is oriented generally orthogonally relative to the second side wall.

* * * * *